US012680394B2

(12) United States Patent　　　　　　(10) Patent No.:　US 12,680,394 B2

Grosz et al.　　　　　　　　　　　　　(45) Date of Patent:　　　Jul. 14, 2026

(54) BI-METALLIC DRILL BIT MANDREL UTILIZING PRECIPITATION HARDENED MATERIAL PRE-JOINED TO A DRILL BIT MANDREL SUITABLE FOR INFILTRATION

(71) Applicant: Halliburton Energy Services, Inc., Houston, TX (US)

(72) Inventors: Gregory Grosz, Magnolia, TX (US); Daniel Brendan Voglewede, Spring, TX (US); Robert W. Arfele, Montgomery, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 18/940,669

(22) Filed: Nov. 7, 2024

(65) Prior Publication Data

US 2026/0125953 A1　　May 7, 2026

(51) Int. Cl.
　　E21B 10/42　　　(2006.01)
　　B22F 5/00　　　　(2006.01)
　　　　　(Continued)

(52) U.S. Cl.
　　CPC .............. E21B 10/42 (2013.01); B22F 7/062 (2013.01); B23K 31/02 (2013.01); E21B 7/04 (2013.01);
　　　　　(Continued)

(58) Field of Classification Search
　　None
　　See application file for complete search history.

(56) References Cited

U.S. PATENT DOCUMENTS 4,492,276 A　*　1/1985　Kamp ..................... E21B 7/068
　　　　　　　　　　　　　　　　　　175/107
6,116,360 A　*　9/2000　Evans ..................... E21B 10/54
　　　　　　　　　　　　　　　　　　175/371
(Continued)

FOREIGN PATENT DOCUMENTS

EP　　　　0731249 A3　　9/1996
EP　　　　0995876 A2　　4/2000

OTHER PUBLICATIONS

Abstract of Isogawa, Sachihiro et al., "Improvement of the forgability of 17-4 precipitation hardening stainless steel by ausforming", Journal of Materials Processing Technology; 74, 1998; pp. 298-306.
(Continued)

*Primary Examiner* — Blake Michener
(74) *Attorney, Agent, or Firm* — NOVAK DRUCE CARROLL LLP

(57)　　　　　　ABSTRACT

Aspects of the subject technology relate to tools, system and methods related to a drilling tool that is fabricated using a bimetallic member that is subjected to an infiltration process. The method can include having an amount of precipitation hardenable steel and an amount of another type of steel. The precipitation hardenable steel and the other type of steel are metallurgically bonded to form a bimetallic member including a casting mandrel portion and a drill string connection portion. A reinforcing powder is infiltrated with a binder while in contact with the casting mandrel portion to form a metal matrix composite about the casting mandrel portion. A cutting structure is fabricated into the metal matrix composite of the drilling tool.

29 Claims, 7 Drawing Sheets

(51) Int. Cl.

| | |
|---|---|
| *B22F 7/06* | (2006.01) |
| *B23K 31/02* | (2006.01) |
| *B23K 101/00* | (2006.01) |
| *B23K 103/18* | (2006.01) |
| *E21B 7/04* | (2006.01) |
| *G06Q 10/087* | (2023.01) |

(52) U.S. Cl.
CPC ...... *G06Q 10/087* (2013.01); *B22F 2005/001* (2013.01); *B23K 2101/002* (2018.08); *B23K 2103/18* (2018.08)

(56) References Cited

U.S. PATENT DOCUMENTS

| | | | |
|---|---|---|---|
| 6,148,936 A * | 11/2000 | Evans .................... E21B 10/46 | |
| | | | 175/425 |
| 6,220,117 B1 | 4/2001 | Butcher | |
| 7,776,256 B2 | 8/2010 | Smith et al. | |
| 7,905,161 B2 | 3/2011 | Butler et al. | |
| 8,047,260 B2 | 11/2011 | Uno et al. | |
| 8,616,089 B2 | 12/2013 | Choe et al. | |
| 9,206,651 B2 | 12/2015 | Stevens et al. | |
| 10,119,339 B2 * | 11/2018 | Voglewede ............. E21B 10/46 | |
| 11,761,049 B1 | 9/2023 | Voglewede | |
| 12,018,531 B2 | 6/2024 | Voglewede et al. | |

| | | | |
|---|---|---|---|
| 2007/0102199 A1 | 5/2007 | Smith et al. | |
| 2010/0133805 A1 | 6/2010 | Stevens et al. | |
| 2010/0276205 A1 * | 11/2010 | Oxford ................... E21B 10/00 | |
| | | | 175/336 |
| 2011/0186261 A1 * | 8/2011 | Choe ....................... E21B 10/46 | |
| | | | 164/76.1 |
| 2014/0291033 A1 * | 10/2014 | Amundsen .......... B23K 20/129 | |
| | | | 76/108.4 |
| 2015/0259985 A1 * | 9/2015 | Thigpen ................. B22F 7/062 | |
| | | | 175/425 |
| 2015/0368980 A1 * | 12/2015 | Cook, III ............... E21B 10/42 | |
| | | | 175/425 |
| 2016/0258031 A1 * | 9/2016 | Voglewede .............. C21D 1/18 | |
| 2016/0265284 A1 * | 9/2016 | Voglewede .............. C22F 1/08 | |
| 2017/0173717 A1 * | 6/2017 | Ther ......................... B22C 9/22 | |
| 2018/0133802 A1 * | 5/2018 | Cook, III ................. B22F 5/00 | |
| 2020/0061732 A1 * | 2/2020 | Stevens ............. B23K 35/0244 | |
| 2021/0114100 A1 * | 4/2021 | Thomas ................ C22C 1/1047 | |
| 2021/0222497 A1 * | 7/2021 | Zhang ................... B33Y 10/00 | |
| 2024/0068299 A1 * | 2/2024 | Zhang .................... E21B 10/08 | |
| 2025/0086541 A1 * | 3/2025 | Al-Temyatt ....... G06Q 10/06312 | |

OTHER PUBLICATIONS

International Search Report & Written Opinion; PCT Application No. PCT/US2024/057336; mailed Aug. 5, 2025.

* cited by examiner

FIG. 3 Prior Art

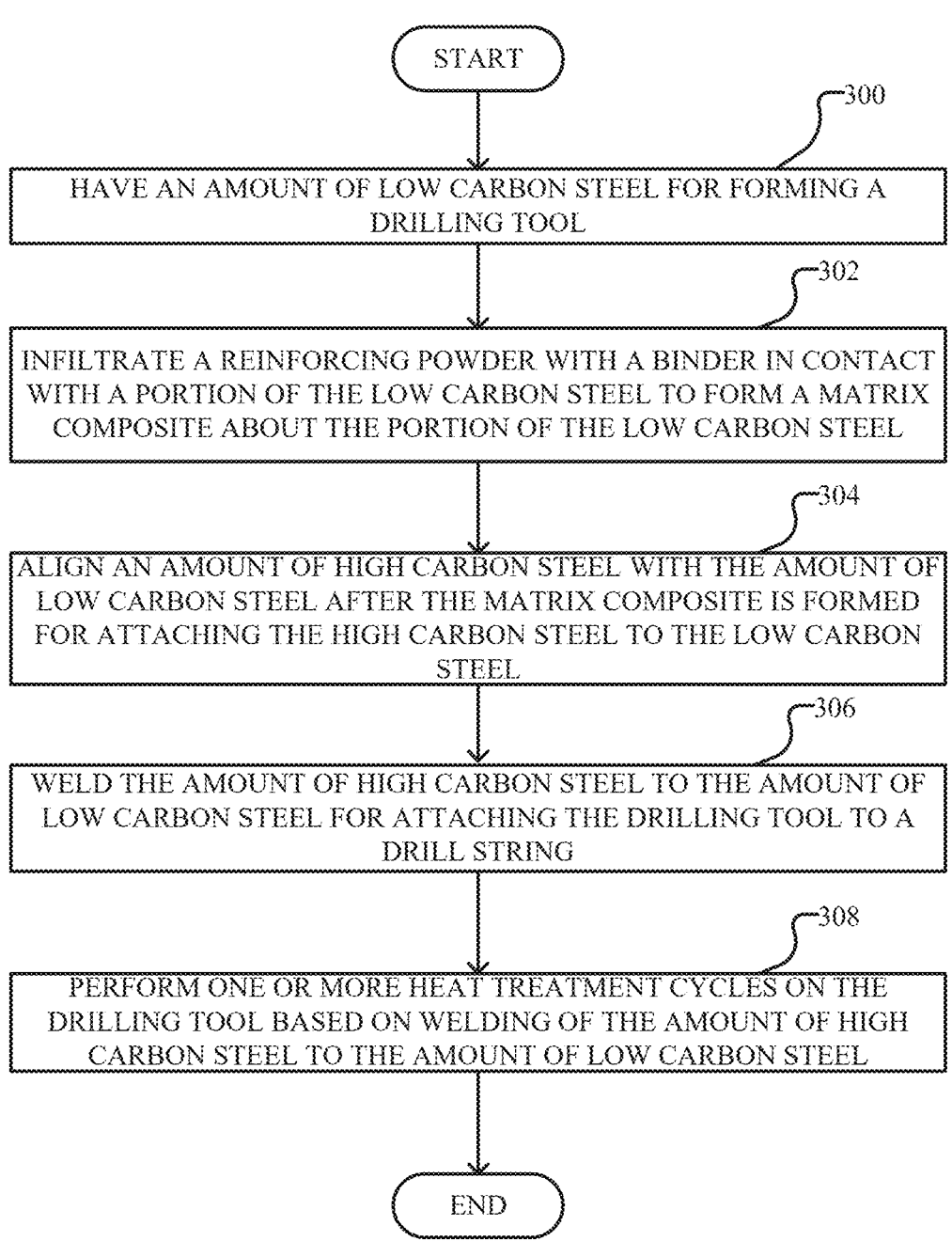

START

300

HAVE AN AMOUNT OF LOW CARBON STEEL FOR FORMING A
DRILLING TOOL

302

INFILTRATE A REINFORCING POWDER WITH A BINDER IN CONTACT
WITH A PORTION OF THE LOW CARBON STEEL TO FORM A MATRIX
COMPOSITE ABOUT THE PORTION OF THE LOW CARBON STEEL

304

ALIGN AN AMOUNT OF HIGH CARBON STEEL WITH THE AMOUNT OF
LOW CARBON STEEL AFTER THE MATRIX COMPOSITE IS FORMED
FOR ATTACHING THE HIGH CARBON STEEL TO THE LOW CARBON
STEEL

306

WELD THE AMOUNT OF HIGH CARBON STEEL TO THE AMOUNT OF
LOW CARBON STEEL FOR ATTACHING THE DRILLING TOOL TO A
DRILL STRING

308

PERFORM ONE OR MORE HEAT TREATMENT CYCLES ON THE
DRILLING TOOL BASED ON WELDING OF THE AMOUNT OF HIGH
CARBON STEEL TO THE AMOUNT OF LOW CARBON STEEL

END

BI-METALLIC DRILL BIT MANDREL UTILIZING PRECIPITATION HARDENED MATERIAL PRE-JOINED TO A DRILL BIT MANDREL SUITABLE FOR INFILTRATION

TECHNICAL FIELD

The present technology pertains to drill tools, and in particular, to drill tools that are built with a bimetallic member that can be subjected to an infiltration process to form a matrix composite about a portion of the bimetallic member.

BACKGROUND

Hydrocarbon production is facilitated through the drilling of wellbores into formations that contain such hydrocarbons. Drilling tools can be deployed and used to drill wellbores and facilitate hydrocarbon production through such wellbores. Specifically, drill bits can be used to cut the formation and create a wellbore through which hydrocarbons can be accessed.

BRIEF DESCRIPTION OF THE DRAWINGS

In order to describe the manner in which the above-recited advantages and features of the disclosed technology can be obtained, a more particular description of the principles briefly described above will be rendered by reference to specific embodiments thereof which are illustrated in the appended drawings. It should be understood that these drawings depict exemplary embodiments only of the disclosed technology and are not to be considered as limiting to the disclosure's scope. In these regards, the principles disclosed herein are explained with additional specificity and detail by way of the accompanying drawings in which:

FIG. 3 illustrates a flowchart for an example method of forming a drill bit through infiltration and welding high-carbon steel to steel post infiltration, in contrast with some aspects of the subject technology;

DETAILED DESCRIPTION

Figure 1:
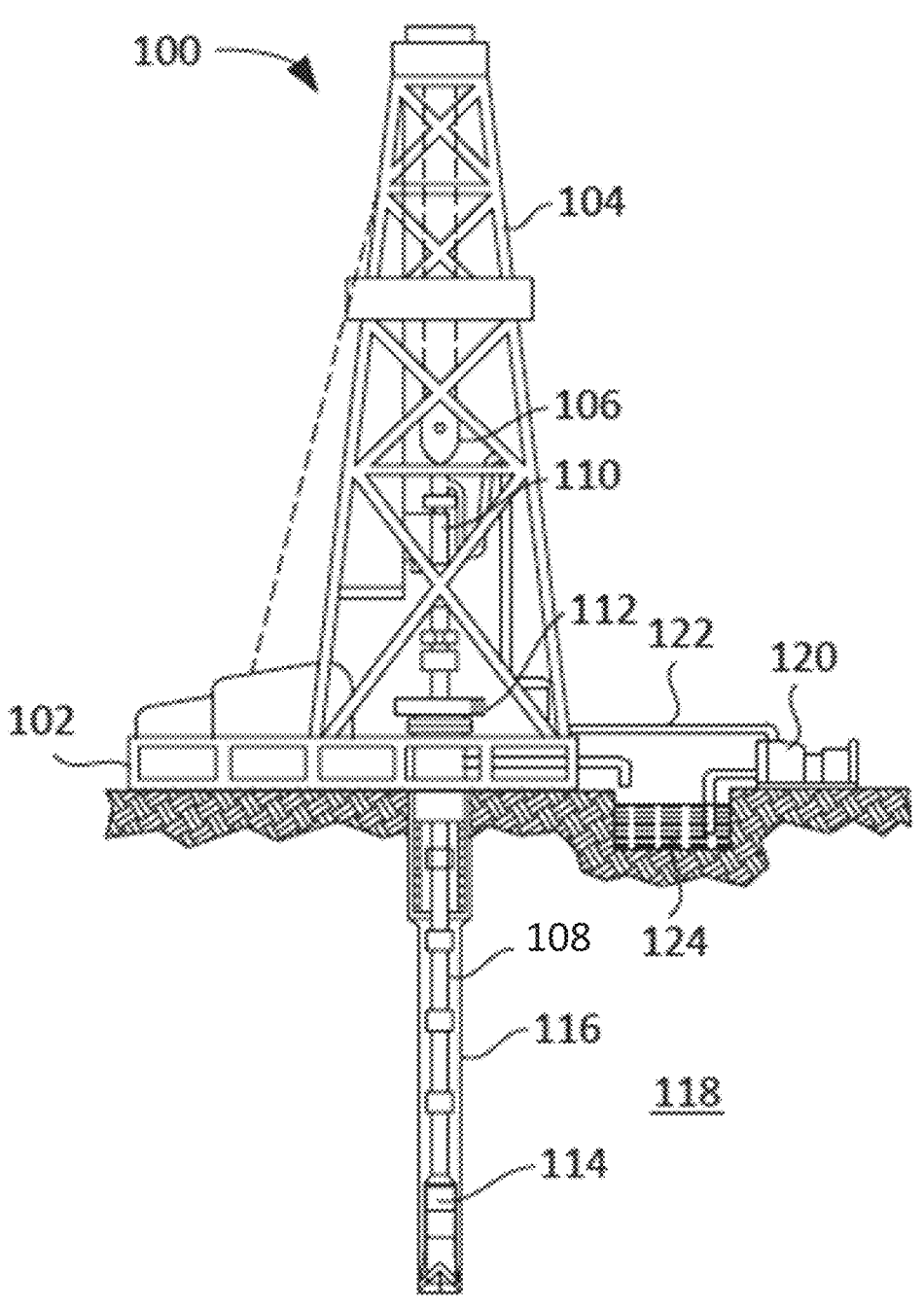
FIG. 1 is a schematic diagram of an example drilling arrangement in accordance with various aspects of the subject technology.

Various embodiments of the disclosed technology are discussed in detail below. While specific implementations are discussed, it should be understood that this is done for illustration purposes only. A person skilled in the relevant art will recognize that other components and configurations may be used without departing from the spirit and scope of the disclosed technology.

Additional features and advantages of the disclosed technology will be set forth in the description which follows, and in part will be obvious from the description, or can be learned by practice of the principles disclosed herein. The features and advantages of the disclosed technology can be realized and obtained by means of the instruments and combinations particularly pointed out in the appended claims. These and other features of the disclosed technology will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

As discussed previously, hydrocarbon production is facilitated through the drilling of wellbores into formations that contain such hydrocarbons. Drilling tools can be deployed and used to drill wellbores and facilitate hydrocarbon production through such wellbores. Specifically, drill bits can be used to cut the formation and create a wellbore through which hydrocarbons can be accessed.

Drilling tools, such as drill bits, are used in the creation and exploration of wellbores for producing hydrocarbons. Rotary drill bits can be used to drill wellbores. One type of rotary drill bit has a bit body comprising (including, but not limited to) matrix and reinforcement materials and can be referred to as a matrix drill bit. Matrix composite drill bits can include cutting elements or inserts positioned at select locations on the exterior of the matrix composite bit body to break apart the formation when forming the wellbore. Further, fluid flow passageways can be formed within the matrix composite bit body to allow for the flow of drilling fluids from associated surface drilling equipment through an interconnected drill string or drill pipe that is coupled to the matrix bit body.

Matrix composite drill bits can be manufactured by placing a reinforcing powder material into a mold and infiltrating the powder material with a binder material, such as a metallic alloy. The various features of the resulting matrix composite drill bit, such as blades, cutter pockets, and fluid flow passageways, can be provided by shaping the mold cavity, by positioning temporary displacement materials within interior portions of the mold cavity, or a combination thereof. Before infiltration, however, a preformed bit blank (also referred to as a casting mandrel) is inserted into the mold cavity and partially buried in the reinforcing powder material. The casting mandrel remains in this partially buried position during the infiltration process. The casting mandrel provides reinforcement for the matrix composite bit body and facilitates the coupling (direct or indirect attachment) of the resulting matrix composite drill bit to a drill string.

The mold with the casting mandrel is then placed into a furnace and the temperature of the mold is increased to a temperature that causes the binder to liquefy and infiltrate (flow into interstitial spaces within) the matrix reinforcement material about the casting mandrel. The furnace maintains the elevated temperature for a sufficient period of time that the infiltration process is deemed complete. Once a designated process time and/or temperature has been reached, the mold containing the infiltrated matrix composite bit is removed from the furnace. Upon being removed from the furnace, the mold begins to rapidly lose heat to its surrounding environment via heat transfer, such as through radiation and/or convection. As follows, the binder-infiltrated matrix composite cools about the casting mandrel such that a solid matrix composite material is formed about and secured to the casting mandrel.

The casting mandrel is formed from a material suitable for bonding with the resultant matrix composite material formed by infiltration of the reinforcing powder material with the binder material. Specifically, the casting mandrel can comprise an applicable steel blank, such as one of low-carbon steel. A low carbon steel can comprise a steel with a carbon content between 0.03% and 0.6% by weight. High temperatures are achieved during the infiltration process, e.g. temperatures around 2100° F. that cause liquification of the binder and infiltration of the liquified binder into the matrix reinforcement material. The casting mandrel is present during the infiltration process such that the matrix composite material forms about and binds to the casting mandrel. Consequently, the casting mandrel is exposed to the high temperatures that are applied during the infiltration process. Therefore, if the casting mandrel comprises high-carbon steel, that high-carbon steel can return to its annealed state when subjected to the high temperatures of the infiltration process, which can be undesired. Therefore, if high-carbon steel is used as the casting mandrel during infiltration, additional (subsequent) heat treatments such as quenching and tempering are likely to be required. More specifically, quenching and tempering of the high-carbon steel casting mandrel, post infiltration, can be required to achieve specific desired properties; for example, martensitic properties that provide rigidity that supports the matrix composite material in a drill bit so formed. High-carbon steel can comprise a steel with a carbon content that is greater than 0.6% by weight, e.g. between 0.6% and 1.0% by weight.

Application of such quenching and tempering heat treatments to the metal matrix material, post infiltration (which can be required to achieve certain specific properties in a casting mandrel comprising high-carbon steel), detrimentally affects the matrix composite material formed during infiltration. Specifically, post-infiltration quenching and tempering can damage or crack the matrix composite material that is formed during infiltration. As a result, it can be undesirable to use high-carbon steel as the casting mandrel in drilling tool manufacturing processes that use infiltration to create a matrix composite material. Accordingly, another type of steel, such as low-carbon steel, can be more desirably used for the casting mandrel during the infiltration process, as such steel does not require application of such post-infiltration heat treatment processes (quenching and tempering) which can ultimately damage the formed matrix composite material.

While steel can advantageously serve as the casting mandrel for attachment to and support of the matrix composite material, some steels can lack certain material properties, that if present, would make it a better material for attaching the drill bit to a drill string, such as by threaded interconnection. More specifically, some steels, e.g. low-carbon steel, lack the mechanical properties, including yield strength and tensile strength, for attaching the drill bit to a drill string. The strength requirements for connections that attach drill bits to drill strings are set through various standards. For example, the American Petroleum Institute® (herein "API") has defined a standard that requires a drill string connection to have a minimum yield strength of 100 ksi (kilo-pounds per square inch). Therefore, while suitable for forming the casting mandrel that the matrix composite material attaches to in forming the drill bit, some steels are not suitable for forming a connection portion for attaching the drill bit to a drill string.

As discussed previously, high-carbon steel can necessitate post infiltration heat treatments that lead to damage in the matrix composite material formed earlier during infiltration, but those treatments of the high-carbon steel are required to instill the necessary strength properties that facilitate attachment of the drill bit to the drill string. In order to exploit the benefits of high-carbon steel as a material for connecting the drill bit to the drill string, such high-carbon steel can be attached to the steel casting mandrel after the matrix composite material is formed through the infiltration process. Specifically, the high-carbon steel can be attached to the steel after the infiltration process through an applicable welding technique such as a welding process that uses a filler material.

There are disadvantages to forming a drill bit by attaching high-carbon steel to another type of steel after infiltration, e.g. through a welding process that uses a filler material. Specifically, the space requirements for forming a suitable weld, post infiltration, between the high-carbon steel and the other type of steel can cause the length of the drill bit to be longer than would otherwise be necessary. In turn, such drill bits can have undesirable performance characteristics during drilling operations due to the extended drill bit length. Further, the weld interface that is created between the other type of steel and the high-carbon steel with the filler material can have defects that ultimately decrease the overall strength of the interface between the other type of steel and the high-carbon steel. Further, such a welding process necessitates two additional heat cycles; that is, the welding process itself and a post welding heat treatment that can result in damage to the matrix composite material. Specifically, the heat cycles introduced by welding the other type of steel and the high-carbon steel together, post infiltration, can introduce defects between the matrix composite material and the other type of steel.

The technology described hereinbelow addresses at least some of the foregoing deficiencies at least in part by metallurgically bonding a precipitation hardenable steel to another type of steel in forming a drilling tool. Specifically, the disclosed technology addresses the foregoing deficiencies by forming a bimetallic member, comprising precipitation hardenable steel and the other type of steel, that can be exposed to and successfully endure the infiltration process to form a matrix composite material as part of forming a drilling tool.

Turning now to FIG. 1, an example drilling arrangement 100 is shown in schematic form, in accordance with various aspects of the subject technology, including the environment in which the instant finished product (drill bit 114 comprising a bimetallic member) is implemented. A drilling platform 102 is equipped with a derrick 104 that supports a hoist 106 for raising and lowering a drill string 108. The hoist 106 suspends a top drive 110 suitable for rotating and lowering the drill string 108 through a well head 112. The drill bit 114 is connected to the lower end of the drill string 108. Torque can be applied to the drill bit 114 by a top drive 110 or a drive motor (not shown in FIG. 1) disposed at the drilling platform. In one configuration, the drill string 108 is rotated to rotate the drill bit 114. In another configuration, a motor is disposed proximate (within close vicinity) the bottom of the drill string 108 that rotates the drill bit 114, but not the drill string 108. A down force may also be controllably applied to the drill bit 114 using the weight of the drill string 108, the placement of drill collars on the drill string 108, and/or a pull-down drive (not shown in FIG. 1). As the drill bit 114 rotates, it creates a wellbore 116 that passes through one or more subterranean substrates 118, otherwise referred to as a formation. A pump 120 circulates drilling fluid through a supply pipe 122 to top drive 110, down through the interior of drill string 108 and out orifices in drill bit 114 into the wellbore 116. The drilling fluid flows up the annulus about the drill string 108 where it aids in maintaining the integrity of the surrounding wellbore 116. Finally, the drilling fluid, laden with cuttings from the drilling process, returns to the surface up through the annulus and into a retention pit 124.

Figure 2:
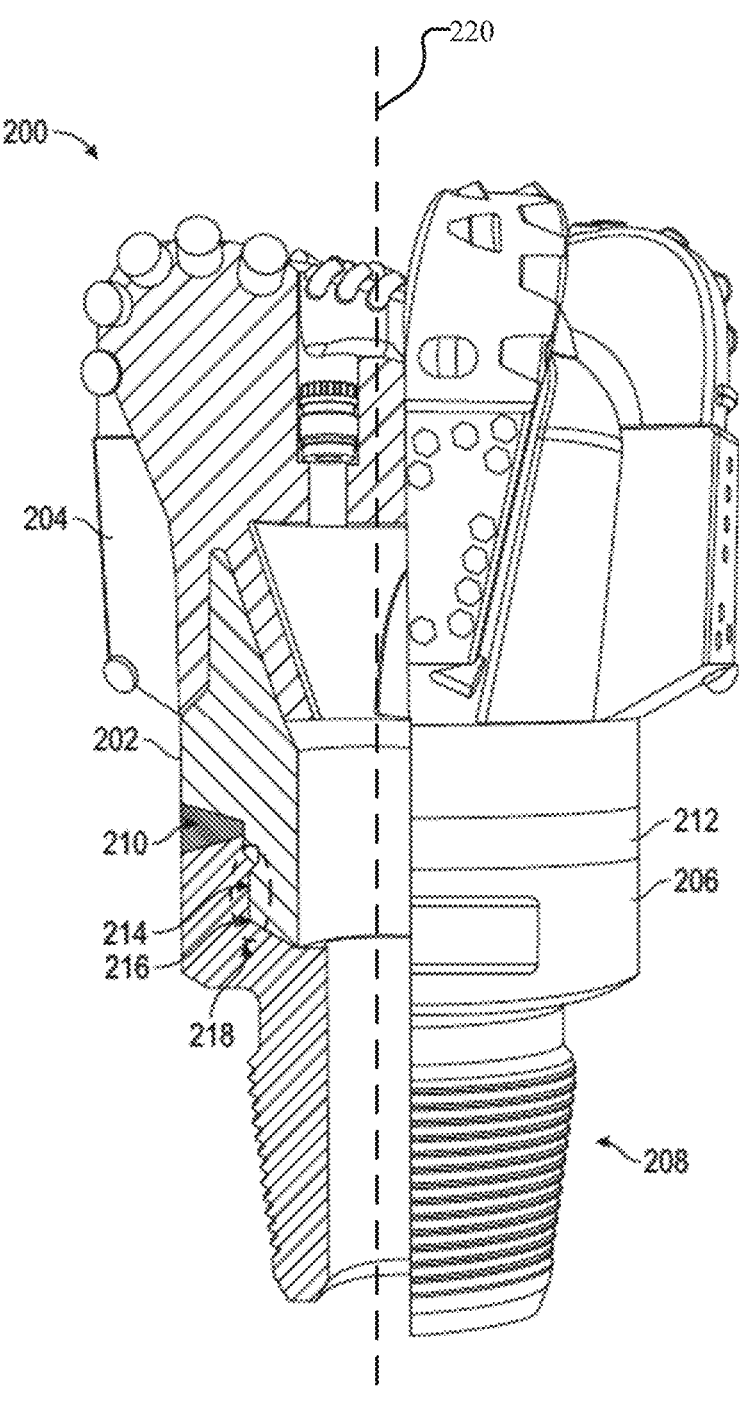
FIG. 2 illustrates a sectional perspective view of a drill bit that is formed by welding high-carbon steel to low-carbon steel after infiltration, in contrast with some aspects of the subject technology.

The disclosure continues with further discussion of drilling tools that are formed by welding high-carbon steel to low-carbon steel after infiltration. FIG. 2 illustrates a partial cross-sectional perspective view of a drill bit 200 that is formed by welding high-carbon steel to low-carbon steel after infiltration. The drill bit 200 includes an amount of low-carbon steel 202 that is used to support and bind to a matrix composite 204 as part of the drill bit 200. Specifically, the low-carbon steel 202 serves as a casting mandrel that is placed into a mold with a reinforcing powder and a binder. Then, the low-carbon steel 202 with the reinforcing powder and the binder in the mold is subjected to high temperatures to infiltrate the reinforcing powder and the binder and form the metal matrix composite 204 about the low-carbon steel 202.

A lower part of the drill bit 200 comprises an amount of high-carbon steel 206 that has threads cut thereabout. The threaded high-carbon steel 206 is used to connect the drill bit 200 to a drill string. Specifically, the high-carbon steel 206 includes a threaded region 208 used to threadedly connect the drill bit 200 to a mating threaded end of a drill string. The high-carbon steel 206 can be used to form this connection between the drill bit 200 and drill string because of the high-strength properties of high-carbon steel 206, that for example, meet API standards for connecting drill bits to drill strings, e.g. API Specification 7K.

The high-carbon steel 206 is connected to the low-carbon steel 202 after infiltration. Specifically, the high-carbon steel 206 is connected to the low-carbon steel 202 through a welding technique that utilizes a filler material. The weld is created in a groove 210 formed between the low-carbon steel 202 and the high-carbon steel 206. More specifically, the weld is formed using a weld material 212 that fills in the groove 210 between the low-carbon steel 202 and the high-carbon steel 206. The groove 210 and corresponding weld material 212 extend about an outer circumference of the drill bit 200 along the interface between the low-carbon steel 202 and the high-carbon steel 206.

The low-carbon steel 202 and the high-carbon steel 206 include corresponding first and second alignment thread regions 214 and 216 that when threadedly mated together establish an alignment region 218. More specifically, mated interconnection of the alignment thread regions 214 and 216 aligns the low-carbon steel 202 component(s) and the high-carbon steel 206 component(s) which facilitates establishment and maintenance of centricity (longitudinal alignment) of those components of the drill bit 200. In this way, when the alignment thread regions 214 and 216 contact each other along the alignment region 218 and are screwed together, the low-carbon steel 202 component(s) and the high-carbon steel 206 component(s) align about the longitudinal axis along the center of the drill bit 200.

The necessity of including groove 210 and alignment region 218 to interconnect the low-carbon steel 202 with the high-carbon steel 206 causes an extension of the overall length of the drill bit 200 along the longitudinal axis 220 of the drill bit 200. To adequately connect the low-carbon steel 202 with the high-carbon steel 206, the groove 210 must have a sufficient longitudinal width (measured vertically in FIG. 2); for example, 1 to 2 inches wide, which necessarily increases the overall longitudinal length of the drill bit 200. Additionally, the alignment region 218 has a specific length; for example, 1 to 2 inches long, that also increases the overall longitudinal length of the drill bit 200. Therefore, forming the drill bit by attaching the high-carbon steel to the low-carbon steel through post infiltration welding as described can increase, typically detrimentally, the overall longitudinal length of the drill bit; for example, 2 to 4 inches. This increase in longitudinal length can be particularly detrimental in directional drilling systems, including rotary steerable systems (RSSs). Specifically, the added length can compromise directional drilling control capabilities and in particular the "build" rate. This can lead to additional periodic stress on the drill bit and the RSS itself.

FIG. 3 illustrates a flowchart for an example method of forming a drill bit through infiltration and welding high-carbon steel to low-carbon steel post infiltration. The method represented by the flowchart shown in FIG. 3 can be implemented to manufacture the drill bit 200 shown in FIG. 2. Therefore, reference will be made to FIG. 2 throughout the discussion of the flowchart in FIG. 3.

At step 300, an amount of low-carbon steel is had (procured, obtained or otherwise made accessible) for forming a drilling tool. Specifically, a blank amount, otherwise a piece, of low-carbon steel that ultimately forms the low-carbon steel 202 of the drill bit 200 can be accessed.

At step 302, a reinforcing powder is infiltrated with a binder in contact with a portion of the low-carbon steel 202 to form a matrix composite 204 about the portion of the low-carbon steel. Specifically, the low-carbon steel 202 can form a casting mandrel that is inserted into a mold with the reinforcing powder and the binder. As follows, the reinforcing powder can be infiltrated with the binder while the low-carbon steel 202 is in the mold to form the matrix composite 204 about the low-carbon steel 202.

At step 304, an amount of high-carbon steel 206 is aligned with the amount of low-carbon steel 202 after the matrix composite 204 is formed at step 302. This alignment is done in preparation of attaching the high-carbon steel 206 to the low-carbon steel 202. The high-carbon steel 206 and low-carbon steel 202 are aligned by mating the first and second alignment thread regions 214 and 216 in the alignment region 218. Alignment is performed after infiltration at step 302, thereby preventing exposure of the high-carbon steel 206 to the high temperatures that are present during the infiltration process. This is to ensure that the high-carbon steel 206 maintains its desired martensitic properties and does not transform into an annealed state.

At step 306, the high-carbon steel 206 is welded to the low-carbon steel 202. Exemplarily, a filler material can be disposed in the groove 210 about the circumference of the drill bit 200 to attach the high-carbon steel 206 and low-carbon steel 202 through welding with a filler material. This welding step 306 can be performed concurrently with, or after the alignment step 304. Further, the welding step 306 is performed after the matrix composite 204 is formed at step 302. At step 308, one or more heat treatment cycles are performed on the drilling tool based on welding of the high-carbon steel 206 to the low-carbon steel 202. Such heat treatment cycles can be performed to relieve stress that is created at and around the welding interface formed between the high-carbon steel 206 and the low-carbon steel 202.

The method of manufacturing the drill bit 200 that is represented by the flowchart depicted in FIG. 3 has some drawbacks. Specifically, the inclusion of the alignment step 304 and the welding step 306 necessitates including the alignment region 218 and the groove 210. As discussed previously, this undesirably increases the overall longitudinal length and width of the drill bit 200. Further, performing the welding process can affect the matrix composite 204. Specifically, a circumferential blank bond line between the matrix composite 204 and the low-carbon steel 202 is susceptible to defects that form during infiltration. Having a thermal event, such as the welding of the high-carbon steel 206 to the low-carbon steel 202 at step 306, in proximity to the circumferential blank bond line can cause additional defects to form along the blank bond line. Such defects can affect the reliability and the durability of the drill bit 200. As used herein, the circumferential blank bond line is the exterior expression of the interface that forms between a casting mandrel and a matrix composite.

The heat treatment cycles that are applied at step 308 after and in response to the welding step also have detrimental implications to this method of manufacturing a drill bit 200. Specifically, the heat treatment cycles add time to the overall process of manufacturing the drill bit 200. Further, the heat treatment cycles expose the drill bit 200, including the matrix composite 204 to detrimentally high temperatures. In turn, this can lead to the formation of defects at or in proximity to the matrix composite 204.

The disclosure now turns to a discussion of forming drilling tools with a bimetallic member that can be subjected to an infiltration process to form a matrix composite about a portion of the bimetallic member. While reference is made to drill bits throughout this disclosure, the technology disclosed and described herein is not limited to drill bits and can be applied to any applicable drilling tool. A drilling tool, as used herein, can include at least a drill bit, a core head or a mill.

With respect to core heads, in a coring operation, an annular cutter called a coring head can be implanted at the end of a tool column. The core head can be operable to remove a volume of material to create a core, which can then be captured and placed in a collection tube and subsequently recovered to the surface for analysis. The technology described herein can be used in fabricating a core head. With respect to a mill, a mill can be used to remove components from a wellbore in which the mill is fabricated according to the technology described herein.

Figure 4:
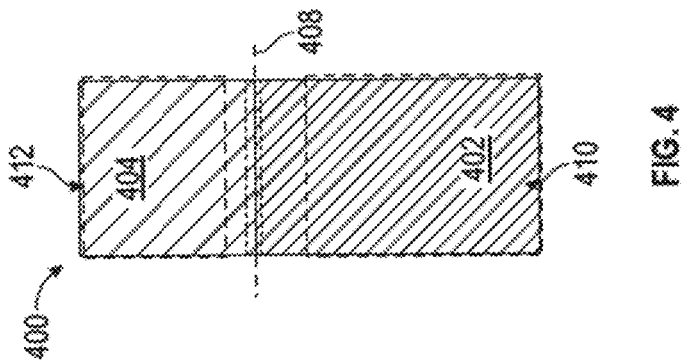
FIG. 4 illustrates a schematic representation of a bimetallic member for forming a drill bit, in accordance with various aspects of the subject technology.

FIG. 4 illustrates a schematic representation of a bimetallic member 400 for forming a drill bit or other applicable drilling tool. A bimetallic member can include a member that comprises two different types of metals. The bimetallic member 400 includes an amount of steel 402 that is coupled to a precipitation hardenable steel 404. The steel 402 and the precipitation hardenable steel 404 can be different types of steel. For example, the steel 402 can comprise an applicable type of steel, such as a low-carbon steel. As will be discussed in greater detail later, the steel 402 can form a casting mandrel portion of the bimetallic member 400 in the fabrication of a drill bit. Further, the precipitation hardenable steel 404 can form a drill string connection portion of the bimetallic member 400. Specifically, the precipitation hardenable steel 404 can form a portion of a drill bit that is used to connect the drill bit to a drill string.

The steel 402 in the bimetallic member 400 can comprise steel having a carbon content between 0.03% and 0.6% by weight. Further, the steel 402 can be in an annealed state. In various embodiments, the steel 402 does not form martensite in response to heat treatments.

The precipitation hardenable steel 404 in the bimetallic member 400 can comprise a steel that is capable of being age hardened. Specifically, the precipitation hardenable steel 404 can comprise a steel that is air hardenable, e.g. a steel that uses air as a quenchant. For example, the precipitation hardenable steel 404 can be aged from a temperature of approximately 925° F. up to approximately 1175° F. and then exposed to air to slowly harden the precipitation hardenable steel 404. This is in contrast to a quenching heat treatment that results in a rapid reduction in temperature and, as discussed previously, can damage a matrix composite. The precipitation hardenable steel can comprise 17-4 steel, 13-4 steel, 15-5 steel, 13-8 steel, AM 350, AM 355, 15-7 steel, 17-7 steel, and other applicable precipitation hardenable steels. A more detailed discussion of precipitation hardening can be found in Martin, J. W. (2012). Precipitation Hardening: Theory and Applications. United Kingdom: Butterworth-Heinemann. For present applications, suitable precipitation hardenable steel can preferably have a minimum achievable yield strength of 100 ksi. Further, the precipitation hardenable steel 404 can comprise a Nickel alloy.

The precipitation hardenable steel 404 and the steel 402 can be metallurgically bonded together to form the bimetallic member 400 through an applicable technique. Metallurgically bonded, as used herein, can include the formation of metallic bonds between atoms of two materials that are bonded together. The precipitation hardenable steel 404 and the steel 402 can be metallurgically bonded together to form a fully bonded cross-section across an interface 408 between the precipitation hardenable steel 404 and the steel 402 to form the bimetallic member 400. Further, the precipitation hardenable steel 404 and the steel 402 can be metallurgically bonded together to form a partially bonded cross-section across an interface and/or a fully bonded cross-section across a portion of an interface.

An applicable welding technique can be used to metallurgically bond the precipitation hardenable steel 404 and the steel 402. Specifically, an applicable welding technique that does not use a filler material can be advantageously used to metallurgically bond the precipitation hardenable steel 404 and the steel 402 to form the bimetallic member 400. For example, the precipitation hardenable steel 404 and the steel 402 can be metallurgically bonded together through friction welding, electron beam welding, laser welding, diffusion bonding, or other applicable types of welding techniques. Friction welding can include rotary friction welding, linear friction welding, and friction stir welding. More detailed discussions of friction welding can be found in Recommended Practices for Friction Welding. (1989). United States: American Welding Society and AWS C6.2/C6.2M: 2021, Specification for Rotary Friction Welding of Metals. (2021). United States: American Welding Society. Further, an applicable welding technique that does use a filler material can be used to metallurgically bond the precipitation hardenable steel 404 and the steel 402 to form the bimetallic member 400. For example, the precipitation hardenable steel 404 and the steel 402 can be metallurgically bonded together through a fusion technique with a filler material, such as aluminum, copper, gold, lead, nickel, silver, and tin.

The bimetallic member 400 comprises a casting mandrel portion 410 and a drill string connection portion 412. The casting mandrel portion 410 is formed in the steel 402 of the bimetallic member 400. The casting mandrel portion 410 serves as a material over which a matrix composite material can be formed through infiltration. The drill string connection portion 412 is formed in the precipitation hardenable steel 404 of the bimetallic member 400. The drill string connection portion 412 functions to support a corresponding drill bit when attached to a drill string. Specifically, the drill string connection portion 412 can withstand compressive, tensile, bending, and torsional forces, both static and cyclic, generated during drilling operations.

Figure 5:
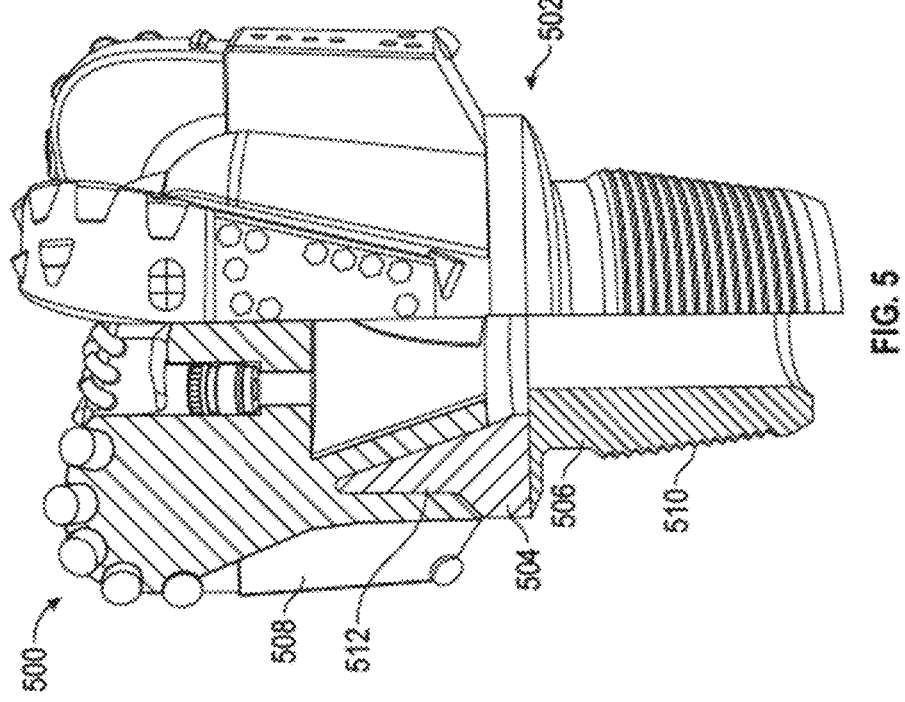
FIG. 5 illustrates a sectional perspective view of a drill bit that is fabricated from a bimetallic member that is formed before infiltration, in accordance with various aspects of the subject technology.

FIG. 5 illustrates a partial cutaway perspective view of a drill bit 500 that is fabricated using a bimetallic member 502 that is formed before infiltration. The bimetallic member 502 used in fabricating the drill bit 500 can, for example, be the bimetallic member 502 that is described herein, configured as schematically depicted at 400 in FIG. 4. Specifically, the bimetallic member 502 that is used in fabricating the drill bit 500 can include an amount of steel 504 and an amount of precipitation hardenable steel 506. The steel 504 and the precipitation hardenable steel 506 can be different types of steel. For example, the steel 504 can be a low-carbon steel.

The drill bit 500 includes a matrix composite 508. The matrix composite 508 is formed by infiltrating a reinforcing powder with a binder while in contact with the steel 504 that is part of a bimetallic member 502. The reinforcing powder can comprise, for example, metal carbides, metal borides, metal oxides, metal nitrides, natural and synthetic diamond, polycrystalline diamond. The binder can comprise applicable metals and metal alloys such as metallic alloys of copper, nickel, manganese, lead, tin, cobalt, phosphorous, and silver. The matrix composite can include metallic constituent components and therefore can be referred to as a metal matrix composite. During the fabrication process of the drill bit 500, the entire bimetallic member 502, including both the steel 504 and the precipitation hardenable steel 506, can be exposed to the elevated temperatures experienced during the infiltration process. The elevated temperatures can cause annealing in the precipitation hardenable steel 506. However, strength properties can be returned to the precipitation hardenable steel 506 without quenching and tempering heat treatments. Specifically, a post-infiltration heat treatment process can be applied to the drill string connection portion of the bimetallic member 502 to achieve specific mechanical properties of the precipitation hardenable steel 506. The post-infiltration heat treatment process can include a hardening, annealing, and/or tempering process that minimizes the chances of forming defects in the matrix composite 508. For example, the precipitation hardenable steel 506 can be strengthened after the infiltration process through air hardening. This behavior is in contrast to that of high-carbon steel which would require quenching and tempering heat treatments, post infiltration, to achieve sufficient strength properties in the high-carbon steel. Undesirably, and as discussed previously, such quenching and tempering heat treatments can damage the matrix composite 508.

Some excess binder can also get in contact with the precipitation hardenable steel 506, and become part of the bimetallic member 502 as a by-product of the infiltration process. This errant binder and any other unintentional by-product materials that are generated during infiltration about the precipitation hardenable steel 506 can be subsequently removed, exposing the precipitation hardenable steel 506 for fabrication into the threaded connection 510 used to couple the drill bit 500 to a drill string. Alternatively, threads of the threaded connection 510 can be formed in the precipitation hardenable steel 506 before infiltration. Accordingly, by-product material that is generated (undesired build up on the threads of the threaded connection) upon the precipitation hardenable steel 506 during infiltration is removed to expose the threaded connection 510.

In various embodiments, the bimetallic member 502 is formed and used in fabricating the drill bit 500 without welding any additional material to the bimetallic member 502 after the infiltration step. Further, the drill bit 500 shown in FIG. 5 lacks both a groove for welding and an alignment region for aligning the precipitation hardenable steel 506 and the steel 504. This is in contrast with the drill bit 200 shown in FIG. 2. In the current embodiment, the groove and the alignment region are unnecessary because the bimetallic member 502 is formed before infiltration, thereby eliminating the need to weld steel, e.g. high-carbon steel, to the steel 504 after infiltration. As a result, a drill bit 500 constructed according to these teachings can be approximately 0.5 inches to approximately 3.0 inches shorter than a drill bit that is formed with a welding groove and/or an alignment region such as depicted in the drill bit 200 of FIG. 2. It will be appreciated that shorter drill bits offer numerous advantages, including improved subterranean maneuverability when drilling wellbores. In addition to being shorter, the drill bit 500 as depicted in FIG. 5 has further advantages over drill bits such as that depicted and described in accordance with the embodiment of FIG. 2. Among others, the steel is not required to be welded after infiltration thereby eliminating the necessity of additional post-infiltration heat treatments. It is desirable to eliminate such heat treatments as they can introduce defects across the apex-shaped interface 512 between the steel 504 and the matrix composite 508. As depicted in the drawing, the apex-shaped interface 512 between the steel 504 and the matrix composite 508 is located predominantly within the drill bit 500, with only the circumferentially running blank bond line exposed at the surface of the drill bit 500.

Figure 6:
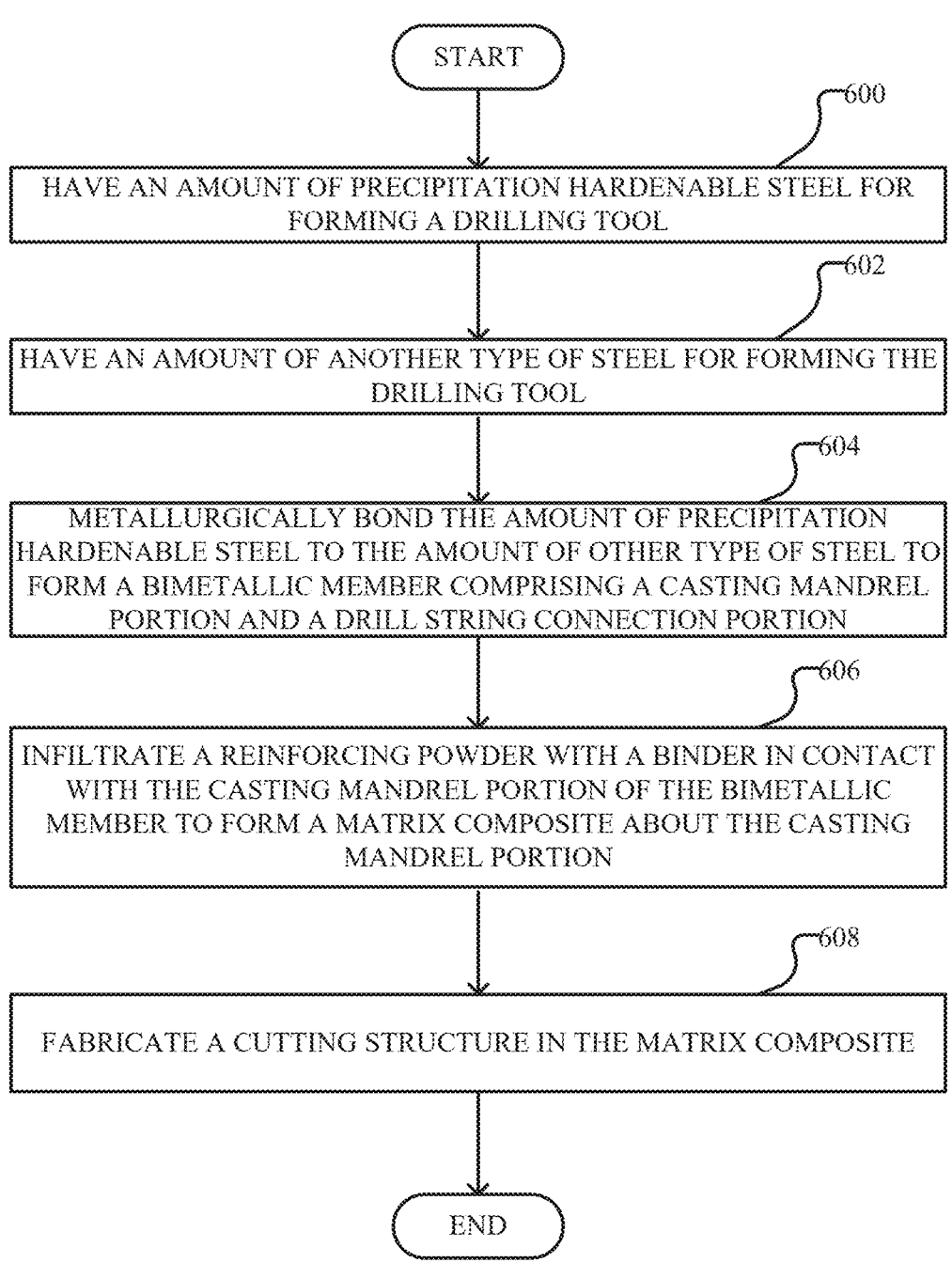
FIG. 6 illustrates a flowchart for an example method of fabricating a drilling tool with a bimetallic member that is fabricated before infiltration, in accordance with various aspects of the subject technology.

FIG. 6 is a flowchart depicting an example method of manufacturing a drilling tool with a bimetallic member that is fabricated before infiltration. The method represented in FIG. 6 is provided by way of example, as there are a variety of ways to carry out the method. Each module shown in FIG. 6 represents one or more steps, processes, methods or routines executed according to the disclosed technology.

At step 600, an amount of precipitation hardenable steel is had (procured, obtained or otherwise made accessible) from a suitable supply of precipitation hardenable steel which is subsequently included in the formation of a drilling tool. At step 602, an amount of another steel is had (procured, obtained or otherwise made accessible) from a suitable supply of the other steel which is also subsequently included in the formation of the drilling tool. The steel that is accessed at step 602 can be a different type of steel from the precipitation hardenable steel that is accessed at step 600. For example, the steel that is accessed at step 602 can comprise a low-carbon steel. At step 604, the amount of precipitation hardenable steel is metallurgically bonded to the amount of the other type of steel thereby forming a bimetallic member. The bimetallic member comprises (includes, but is not limited to) a casting mandrel portion and a drill string connection portion. It is upon the casting mandrel portion that a matrix composite can be formed. The drill string connection portion is configured for connecting the drilling tool to a drill string.

The bimetallic member can be formed and stocked for later use. Specifically, a drill bit manufacturer can receive or manufacture an inventory comprising a plurality of bimetallic members serving as blanks. As follows, the drill bit manufacturer can then fabricate drill bits, either in parallel or in series, using the stored blank bimetallic members. In various embodiments, the bimetallic member can be manufactured or otherwise outsourced to a third-party vendor who can supply the fabricated bimetallic members to a drill bit manufacturer.

At step 606, a reinforcing powder is infiltrated with a binder while in contact with the casting mandrel portion of the bimetallic member to form a matrix composite about the casting mandrel portion. Specifically, at least the casting mandrel portion of the bimetallic member can be placed into a mold containing the reinforcing powder and the binder. As follows, the entire bimetallic member can be exposed to the high temperatures of infiltration. A bonding interface is formed between the precipitation hardenable steel and the other type of steel that is comprised in (included in, but not necessarily exclusively) the bimetallic member. The interface is formed by mating surfaces of the other type of steel and the precipitation hardenable steel and is sometimes referred to as a blank bond line because of how the interface appears in cross-section as depicted at 512 in the accompanying drawings. The precipitation hardenable steel and the other type of steel are metallurgically bonded to each other through a technique that leads to a fully bonded interface between the precipitation hardenable steel and the other type of steel. Alternatively, the precipitation hardenable steel and the other type of steel can be metallurgically bonded to form a partially bonded interface.

At step 608, a cutting structure is formed in the matrix composite. This can be performed as part of forming the drilling tool. The cutting structure can be formed using an applicable technique for displacing material preferentially during the infiltration process of the matrix composite material to allow the attachment of a desired cutter, such as in current methods. Further, the cutting structure can be formed in the matrix composite after the precipitation hardenable steel is subjected to an age hardening process. This can be done without performing either one of quenching or tempering heat treatments, as is required to harden high-carbon steel. Accordingly, using a bimetallic member that is fabricated with precipitation hardenable steel and exposing the bimetallic member to the high temperatures of infiltration eliminates the need to subject the drill tool, including the matrix composite, to post infiltration quenching and tempering heat treatments. This is advantageous as it reduces the overall manufacturing time of the drill tool. Further, it reduces the chance of introducing defects in the matrix composite through post-infiltration heat treatment.

Figure 7A:
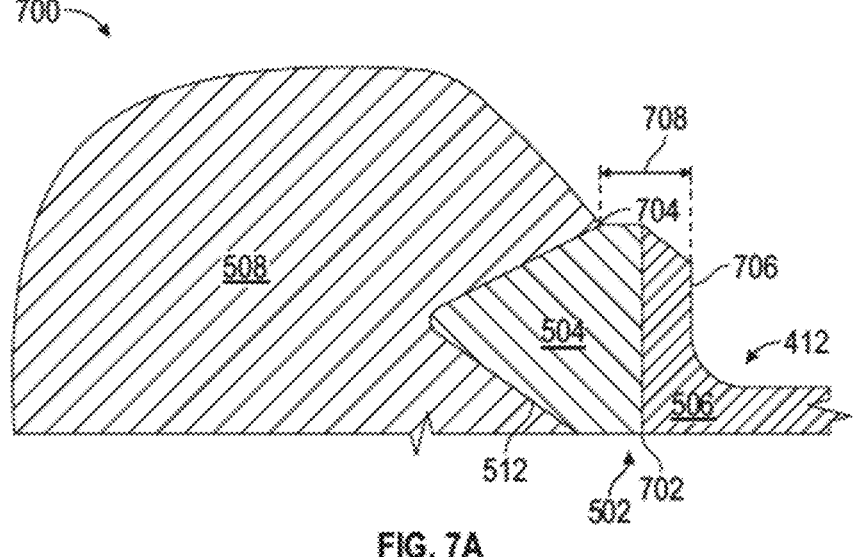
FIG. 7A illustrates a cross-sectional view of a portion of a drill bit configured, in accordance with various aspects of the subject technology.

FIG. 7A illustrates a cross-sectional view of approximately one-half of an annular-shaped drill bit 700 lying on its side, above its longitudinal axis (not shown), with the cutting end of the drill bit 700 to the left (downhole) and the drill string interconnecting end of the drill bit 700 to the right (up-hole). The drill bit 700 includes the bimetallic member 502 that comprises the steel 504 and the precipitation hardenable steel 506. A bonding interface 702 (exemplarily, washer shaped) is formed by the juncture of the precipitation hardenable steel 506 and the steel 504. The bulbous-shaped matrix composite 508 is formed about the steel 504 as exemplarily depicted in FIG. 7A. The exposed exterior surface of the matrix composite 508 extends up-hole (to the right in FIG. 7A) to the circumferentially extending blank bond line 704 (visible as a point in FIG. 7A), and above which (to the right) the steel 504 extends as shown in FIG. 7A. The circumferential blank bond line 704 denotes the exposed transition from the matrix composite 508 to the steel 504 at the surface of the drill bit 700. The apex-shaped interface 512 between the steel 504 and the matrix composite 508 is located predominantly within the drill bit 700, with only the circumferentially running blank bond line 704 exposed at the surface of the drill bit 700 and represented by the point 704 in FIG. 7A.

The exterior of the washer-shaped bonding interface 702 between the steel 504 and the precipitation hardenable steel 506 is positioned longitudinally proximate to, but slightly spaced apart from the circumferential blank bond line 704 as depicted in FIG. 7A. In this configuration, the matrix composite 508 is spaced apart from the precipitation hardenable steel 506 by the steel 504, that is positioned therebetween.

The drill bit 700 comprises a drill string connection portion 412 that is formed in the precipitation hardenable steel 506. The drill string connection portion 412 includes a sealing surface 706 that serves as a shoulder for abutting contact with the drill string when the drill bit 700 is attached thereto. The sealing surface 706 and the circumferential blank bond line 704 are separated by a longitudinally measured distance 708 as depicted in FIG. 7A. The distance 708 is made up of (comprises) both a longitudinally extending portion of the steel 504 and a longitudinally extending portion of the precipitation hardenable steel 506. The longitudinally extending portions of steel 504 and precipitation hardenable steel 506 that are included in the distance measurement 708 define how close the washer shaped bonding interface 702 is to the circumferential blank bond line 704. That is, the amount of the precipitation hardenable steel 506 and the amount of the steel 704 that make up the distance 708 define how close the bonding interface 702 is to the circumferential blank bond line 704.

Figure 7B:
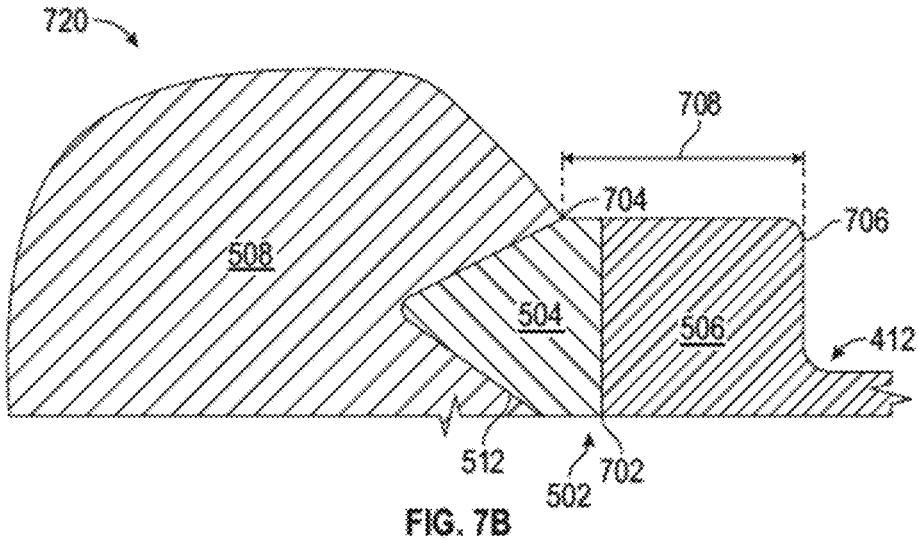
FIG. 7B illustrates a cross-sectional view of a portion of another drill bit having a greater longitudinal length, in comparison to the drill bit illustrated in FIG. 7A.

FIG. 7B illustrates a similar view as that shown in FIG. 7A, but of a differently configured drill bit 720. In this drill bit 720, the sealing surface 706 is positioned longitudinally further away from the circumferential blank bond line 704 in comparison to the drill bit 700 depicted in FIG. 7A. It has been found particularly advantageous, at least from the perspective of subterranean maneuverability of the drill bit, that as illustrated in FIG. 7B, approximately 75% by weight (give or take 10% by weight) of the material making up the longitudinal distance 708 between the circumferential blank bond line 704 and the sealing surface 706 is precipitation hardenable steel 506. Correspondingly, approximately 25% by weight (give or take 10% by weight) of the material making up the longitudinal distance 708 between the circumferential blank bond line 704 and the sealing surface 706 is the other type of steel from the precipitation hardenable steel, e.g. low-carbon steel. In these regards, the longitudinal distance 708 as depicted in FIG. 7B can be proportional to the overall dimensions of the drill bit 720.

In various embodiments, the materials encompassed within the distance measurement 708 as depicted in each of FIGS. 7A and 7B include the steel 504 and the precipitation hardenable steel and lacks any welding filler material. Specifically, the bonding interface 702 can be formed without any welding filler material. Further, in various embodiments, the bonding interface 702 can have a minimum achievable yield strength of at least 100 ksi.

Figure 8:
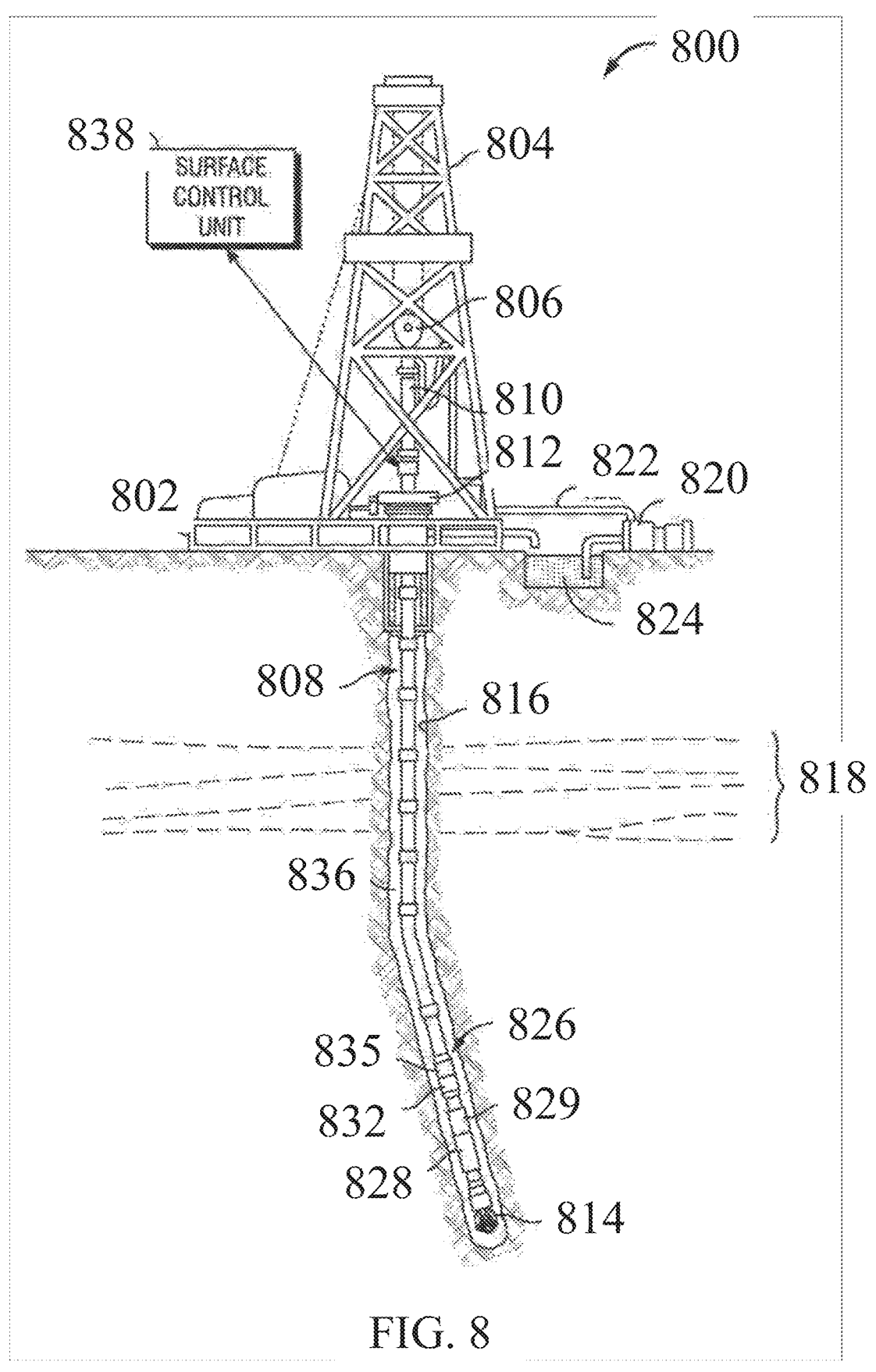
FIG. 8 depicts a schematic view of a drilling operation utilizing a directional drilling system, in accordance with various aspects of the subject technology.

The disclosure now continues with a discussion of directional drilling systems that can implement the technology described herein. FIG. 8 depicts a schematic view of a drilling operation utilizing a directional drilling system 800, in accordance with one or more of the disclosed embodiments. The system of the present disclosure will be specifically described below such that the system is used to direct a drill bit when drilling a wellbore, such as a subsea well or a land well. Further, it will be understood that the present disclosure is not limited to only drilling an oil well. The present disclosure also encompasses natural gas wellbores, other hydrocarbon wellbores, or wellbores in general. Further, the present disclosure may be used for the exploration and formation of geothermal wellbores intended to provide a source of heat energy instead of hydrocarbons.

Accordingly, FIG. 8 shows a tool string 826 disposed in a directional borehole 816. The tool string 826 including a rotary steerable system 828 in accordance with various embodiments. The rotary steerable system 828 provides full or almost full 3D directional control of the drill bit 814. A drilling platform 802 supports a derrick 804 having a traveling block 806 for raising and lowering a drill string 808. A kelly 810 supports the drill string 808 as the drill string 808 is lowered through a rotary table 812. In one or more embodiments, a topdrive is used to rotate the drill string 808 in place of the kelly 810 and the rotary table 812. A drill bit 814 is positioned at the downhole end of the tool string 826, and, in one or more embodiments, may be driven by a downhole motor 829 positioned on the tool string 826 and/or by rotation of the entire drill string 808 from the surface. As the bit 814 rotates, the bit 814 creates the borehole 816 that passes through various formations 818. In accordance with the present disclosure, the bit 814 can exemplarily be of the bimetallic type pursuant to the presently described technology. A pump 820 circulates drilling fluid through a feed pipe 822 and downhole through the interior of drill string 808, through orifices in drill bit 814, back to the surface via the annulus 836 around drill string 808, and into a retention pit 824. The drilling fluid transports cuttings from the borehole 816 into the pit 824 and aids in maintaining the integrity of the borehole 816. The drilling fluid may also drive the downhole motor 829.

The tool string 826 may include one or more logging while drilling (LWD) or measurement-while-drilling (MWD) tools 832 that collect measurements relating to various borehole and formation properties as well as the position of the bit 814 and various other drilling conditions as the bit 814 extends the borehole 816 through the formations 818. The LWD/MWD tool 832 may include a device for measuring formation resistivity, a gamma ray device for measuring formation gamma ray intensity, devices for measuring the inclination and azimuth of the tool string 826, pressure sensors for measuring drilling fluid pressure, temperature sensors for measuring borehole temperature, etc.

The tool string 826 may also include a telemetry module 834. The telemetry module 834 receives data provided by the various sensors of the tool string 826 (e.g., sensors of the LWD/MWD tool 832), and transmits the data to a surface unit 838. Data may also be provided by the surface unit 838, received by the telemetry module 834, and transmitted to the tools (e.g., LWD/MWD tool 832, rotary steering tool 828, etc.) of the tool string 826. In one or more embodiments, mud pulse telemetry, wired drill pipe, acoustic telemetry, or other telemetry technologies known in the art may be used to provide communication between the surface control unit 838 and the telemetry module 834. In one or more embodiments, the surface unit 838 may communicate directly with the LWD/MWD tool 832 and/or the rotary steering tool 828. The surface unit 838 may be a computer stationed at the well site, a portable electronic device, a remote computer, or distributed between multiple locations and devices. The unit 838 may also be a control unit that controls functions of the equipment of the tool string 826.

The rotary steerable system 828 is configured to change the direction of the tool string 826 and/or the drill bit 814, such as based on information indicative of tool 828 orientation and a desired drilling direction. In one or more embodiments, the rotary steerable system 828 is coupled to the drill bit 814 and drives rotation of the drill bit 814. Specifically, the rotary steerable system 828 rotates in tandem with the drill bit 814. In one or more embodiments, the rotary steerable system 828 is a point-the-bit system or a push-the-bit system.

The drill bit 814 can be formed in accordance with the presently described technology. Accordingly, the drill bit 814 can be shorter than other drill bits that do not use a precipitation hardenable steel, with other steel, to form a bimetallic member that can then be subjected to infiltration. As discussed previously, this has numerous advantages in directional drilling applications, such as with the directional drilling system 800 illustrated in FIG. 8. Specifically, improved drilling control capabilities can be achieved with a reduction of additional stress on the drill bit 814. While the technology is described herein as being implemented with the rotary steerable system 828, in various embodiments, it can be implemented with other directional drilling systems, such as positive displacement motor systems.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "down-hole," "up-hole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the embodiments shown are illustrated such that the orientation is such that the left-hand side is downhole compared to the right-hand side which is up-hole.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" or "comprises" or "comprised" should be understood to mean including, but not limited to. That is, additional elements/steps may be present, but it is the listed elements/steps that are required to be present.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1. A method of manufacturing a drilling tool for a downhole drill string comprising: having an amount of precipitation hardenable steel; having an amount of steel; metallurgically bonding the amount of precipitation hardenable steel to the amount of steel, thereby forming a bimetallic member comprising a casting mandrel portion and a drill string connection portion; infiltrating a reinforcing powder with a binder in contact with the casting mandrel portion of the bimetallic member to form a metal matrix composite about the casting mandrel portion; and fabricating a cutting structure in the metal matrix composite.

Statement 2. The method of statement 1, further comprising forming a threaded connection in the drill string connection portion of the bimetallic member for attaching the drilling tool to a downhole drill string.

Statement 3. The method of either statement 1 or 2, wherein the bimetallic member is formed without welding any additional material to the bimetallic member after infiltrating the reinforcing powder with the binder.

Statement 4. The method of any of statements 1 through 3, further comprising performing a post-infiltration heat treatment process.

Statement 5. The method of any of statements 1 through 4, wherein the amount of precipitation hardenable steel and the amount of steel are metallurgically bonded together before the infiltration step using friction welding, electron beam welding, laser welding, diffusion bonding, or a combination thereof.

Statement 6. The method of any of statements 1 through 5, wherein the amount of precipitation hardenable steel and the amount of steel are metallurgically bonded together before the infiltration step using fusion with a filler material.

Statement 7. The method of any of statements 1 through 6, wherein the steel is a low-carbon steel and comprises a carbon content between 0.03% and 0.6% by weight.

Statement 8. The method of any of statements 1 through 7, wherein the amount of precipitation hardenable steel comprises a minimum achievable yield strength of 100 ksi.

Statement 9. The method of any of statements 1 through 8, wherein the amount of precipitation hardenable steel comprises a Nickel alloy.

Statement 10. The method of any of statements 1 through 9, wherein the amount of precipitation hardenable steel and the amount of steel are bonded together to form the bimetallic member without using a V-weld groove or an alignment thread region about a bonding interface between the amount of precipitation hardenable steel and the amount of steel.

Statement 11. The method of statement 10, wherein a length of the bimetallic member from a circumferential blank bond line between the metal matrix composite and the bimetallic member is reduced by approximately 0.5 inches to approximately 3 inches in comparison to bimetallic members for manufacturing drill tools that are formed with a use of one of a V-weld groove or an alignment thread region to connect amounts of metals to form the bimetallic members.

Statement 12. The method of any of statements 1 through 11, wherein a bonding interface between the amount of precipitation hardenable steel and the amount of steel to form the bimetallic member is a substantially fully bonded cross-section.

Statement 13. The method of any of statements 1 through 12, wherein a bonding interface between the amount of precipitation hardenable steel and the amount of steel to form the bimetallic member is in proximity to a blank bond line where the metal matrix composite is attached to the casting mandrel portion of the bimetallic member.

Statement 14. A drilling tool for a downhole drill string comprising: a casting mandrel portion comprising an amount of steel; a drill string connection portion comprising an amount of precipitation hardenable steel; a cutting structure fabricated in a metal matrix composite formed about the casting mandrel portion, wherein the metal matrix composite comprises a reinforcing powder infiltrated with a binder in contact with the casting mandrel portion; and a bimetallic member comprising the amount of steel and the amount of precipitation hardenable steel metallurgically bonded together before the infiltration step.

Statement 15. The drilling tool of statement 14, wherein the steel is a low-carbon steel and comprises a carbon content between 0.03% and 0.6% by weight.

Statement 16. The drilling tool of either statement 14 or 15, wherein the amount of precipitation hardenable steel has a minimum achievable yield strength of 100 ksi.

Statement 17. The drilling tool of any of statements 14 through 16, wherein the amount of precipitation hardenable steel comprises a Nickel alloy.

Statement 18. The drilling tool of any of statements 14 through 17, further comprising applying a post infiltration heat treatment process to the drill string connection portion.

Statement 19. The drilling tool of any of statements 14 through 18, wherein the bimetallic member further comprises a bonding interface between the amount of precipitation hardenable steel and the amount of steel, and further wherein the bonding interface has a substantially fully bonded cross-section.

Statement 20. The drilling tool of any of statements 14 through 19, wherein the bimetallic member further comprises a bonding interface between the amount of precipitation hardenable steel and the amount of steel, wherein the bonding interface is located proximate to a circumferential blank bond line where the metal matrix composite is attached to the casting mandrel portion of the bimetallic member.

Statement 21. The drilling tool of any of statements 14 through 20, further comprising a bonding interface between the amount of the precipitation hardenable steel and the amount of the steel and the bonding interface is formed without a filler material.

Statement 22. The drilling tool of statement 21, wherein the bonding interface comprises a minimum achievable yield strength of 100 ksi.

Statement 23. A directional drilling system comprising: a directional drilling tool integrated in a drill string; a drill bit coupled to the directional drilling tool, wherein the drill bit comprises: a casting mandrel portion comprising an amount of steel; a drill string connection portion comprising an amount of precipitation hardenable steel for coupling the drill bit to the drill string; a cutting structure fabricated in a metal matrix composite formed about the casting mandrel portion, wherein the metal matrix composite comprises a reinforcing powder infiltrated with a binder in contact with the casting mandrel portion; and a bimetallic member comprising the amount of steel and the amount of precipitation hardenable steel metallurgically bonded together before the infiltration step.

Statement 24. The directional drilling system of statement 23, wherein the directional drilling tool comprises a rotary steerable system.

Statement 25. The directional drilling system of statement 23, wherein the directional drilling tool comprises a positive displacement motor system.

Statement 26. A method of performing a drilling operation comprising: coupling a drill bit to a drill string, wherein the drill bit comprises: a casting mandrel portion comprising an amount of steel; a drill string connection portion comprising an amount of precipitation hardenable steel for coupling the drill bit to the drill string; a cutting structure fabricated in a metal matrix composite formed about the casting mandrel portion, wherein the metal matrix composite comprises a reinforcing powder infiltrated with a binder in contact with the casting mandrel portion; and a bimetallic member comprising the amount of steel and the amount of precipitation hardenable steel metallurgically bonded together before the infiltration step; and operating the drill string with the drill bit in a downhole environment to perform the drilling operation.

Statement 27. The method of statement 26, wherein the drill string further comprises a directional drilling tool coupled to the drill bit, the method further comprising directionally controlling the drill bit through the directional drilling tool in performance of the drilling operation.

Statement 28. The method of statement 27, wherein the directional drilling tool comprises a rotary steerable system for controlling the drill bit.

Statement 29. The method of statement 27, wherein the directional drilling tool comprises a positive displacement motor system for controlling the drill bit.

Statement 30. A method comprising: obtaining an amount of precipitation hardenable steel; obtaining an amount of another steel; metallurgically bonding the amount of precipitation hardenable steel to the amount of the another steel, thereby forming a bimetallic member comprising a casting mandrel portion and a drill string connection portion; storing the bimetallic member as one of an inventory comprising a plurality of blank bimetallic members; retrieving the bimetallic member out of the inventory of a plurality of blank bimetallic members; infiltrating a reinforcing powder with a binder in contact with the casting mandrel portion of the bimetallic member to form a metal matrix composite about the casting mandrel portion; and fabricating a cutting structure in the metal matrix composite.

What is claimed is:

1. A method of manufacturing a drilling tool for a downhole drill string comprising:

having an amount of precipitation hardenable steel;

having an amount of steel, distinct from the precipitation hardenable steel;

metallurgically bonding the amount of precipitation hardenable steel to the amount of steel, thereby forming a bimetallic member comprising a casting mandrel portion and a drill string connection portion;

infiltrating a reinforcing powder with a binder in contact with the casting mandrel portion of the bimetallic member to form a metal matrix composite about the casting mandrel portion, after the amount of precipitation hardenable steel is metallurgically bonded to the amount of steel; and fabricating a cutting structure in the metal matrix composite.

2. The method of claim 1, further comprising forming a threaded connection in the drill string connection portion of the bimetallic member for attaching the drilling tool to a downhole drill string.

3. The method of claim 1, wherein the bimetallic member is formed without welding any additional material to the bimetallic member after infiltrating the reinforcing powder with the binder.

4. The method of claim 1, further comprising performing a post-infiltration heat treatment process.

5. The method of claim 1, wherein the amount of precipitation hardenable steel and the amount of steel are metallurgically bonded together before the infiltration step using friction welding, electron beam welding, laser welding, diffusion bonding, or a combination thereof.

6. The method of claim 1, wherein the metallurgical bonding comprises using fusion with a filler material and is performed before the infiltration step.

7. The method of claim 1, wherein the steel is a low-carbon steel and comprises a carbon content between 0.03% and 0.6% by weight.

8. The method of claim 1, wherein the amount of precipitation hardenable steel comprises a minimum achievable yield strength of 100 ksi.

9. The method of claim 1, wherein the amount of precipitation hardenable steel comprises a Nickel alloy.

10. The method of claim 1, wherein the amount of precipitation hardenable steel and the amount of steel are bonded together to form the bimetallic member without using a V-weld groove or an alignment thread region about a bonding interface between the amount of precipitation hardenable steel and the amount of steel.

11. The method of claim 1, wherein a bonding interface between the amount of precipitation hardenable steel and the amount of steel to form the bimetallic member is a substantially fully bonded cross-section.

12. The method of claim 1, wherein a bonding interface between the amount of precipitation hardenable steel and the amount of steel to form the bimetallic member is in proximity to a blank bond line where the metal matrix composite is attached to the casting mandrel portion of the bimetallic member.

13. A drilling tool for a downhole drill string comprising:
a casting mandrel portion comprising an amount of steel;
a drill string connection portion comprising an amount of precipitation hardenable steel, wherein the amount of steel is distinct from the amount of precipitation hardenable steel;
a cutting structure fabricated in a metal matrix composite formed about the casting mandrel portion, wherein the metal matrix composite comprises a reinforcing powder infiltrated with a binder in contact with the casting mandrel portion; and
a bimetallic member comprising the amount of steel and the amount of precipitation hardenable steel metallurgically bonded together before the reinforcing powder is infiltrated with the binder.

14. The drilling tool of claim 13, wherein the steel is a low-carbon steel and comprises a carbon content between 0.03% and 0.6% by weight.

15. The drilling tool of claim 13, wherein the amount of precipitation hardenable steel has a minimum achievable yield strength of 100 ksi.

16. The drilling tool of claim 13, wherein the amount of precipitation hardenable steel comprises a Nickel alloy.

17. The drilling tool of claim 13, wherein the drill string connection portion is treated through a post infiltration heat treatment.

18. The drilling tool of claim 13, wherein the bimetallic member further comprises a bonding interface between the amount of precipitation hardenable steel and the amount of steel, and further wherein the bonding interface has a substantially fully bonded cross-section.

19. The drilling tool of claim 13, wherein the bimetallic member further comprises a bonding interface between the amount of precipitation hardenable steel and the amount of steel, wherein the bonding interface is located proximate to a circumferential blank bond line where the metal matrix composite is attached to the casting mandrel portion of the bimetallic member.

20. The drilling tool of claim 13, further comprising a bonding interface between the amount of the precipitation hardenable steel and the amount of the steel and the bonding interface is formed without a filler material.

21. The drilling tool of claim 20, wherein the bonding interface comprises a minimum achievable yield strength of 100 ksi.

22. A directional drilling system comprising:
a directional drilling tool integrated in a drill string; and
a drill bit coupled to the directional drilling tool, wherein the drill bit comprises:
a casting mandrel portion comprising an amount of steel;
a drill string connection portion comprising an amount of precipitation hardenable steel for coupling the drill bit to the drill string wherein the amount of steel is distinct from the amount of precipitation hardenable steel;
a cutting structure fabricated in a metal matrix composite formed about the casting mandrel portion, wherein the metal matrix composite comprises a reinforcing powder infiltrated with a binder in contact with the casting mandrel portion; and
a bimetallic member comprising the amount of steel and the amount of precipitation hardenable steel metallurgically bonded together before the reinforcing powder is infiltrated with the binder.

23. The directional drilling system of claim 22, wherein the directional drilling tool comprises a rotary steerable system.

24. The directional drilling system of claim 22, wherein the directional drilling tool comprises a positive displacement motor system.

25. A method of performing a drilling operation comprising:
coupling a drill bit to a drill string, wherein the drill bit comprises:
a casting mandrel portion comprising an amount of steel;
a drill string connection portion comprising an amount of precipitation hardenable steel for coupling the drill bit to the drill string wherein the amount of steel is distinct from the amount of precipitation hardenable steel;
a cutting structure fabricated in a metal matrix composite formed about the casting mandrel portion, wherein the metal matrix composite comprises a reinforcing powder infiltrated with a binder in contact with the casting mandrel portion; and
a bimetallic member comprising the amount of steel and the amount of precipitation hardenable steel metallurgically bonded together before the reinforcing powder is infiltrated with the binder; and operating the drill string with the drill bit in a downhole environment to perform the drilling operation.

26. The method of claim 25, wherein the drill string further comprises a directional drilling tool coupled to the drill bit, the method further comprising directionally controlling the drill bit through the directional drilling tool in performance of the drilling operation.

27. The method of claim 26, wherein the directional drilling tool comprises a rotary steerable system for controlling the drill bit.

28. The method of claim 26, wherein the directional drilling tool comprises a positive displacement motor system for controlling the drill bit.

29. A method comprising:

obtaining an amount of precipitation hardenable steel;

obtaining an amount of another steel, wherein the amount of another steel is distinct from the amount of precipitation hardenable steel;

metallurgically bonding the amount of precipitation hardenable steel to the amount of the another steel, thereby forming a blank bimetallic member comprising a casting mandrel portion and a drill string connection portion;

storing the blank bimetallic member as one of an inventory comprising a plurality of blank bimetallic members;

retrieving the blank bimetallic member out of the inventory of a plurality of blank bimetallic members;

infiltrating a reinforcing powder with a binder in contact with the casting mandrel portion of the blank bimetallic member to form a metal matrix composite about the casting mandrel portion, after the amount of precipitation hardenable steel is metallurgically bonded to the amount of steel; and fabricating a cutting structure in the metal matrix composite.

* * * * *